United States Patent
Lim et al.

(10) Patent No.: US 7,715,306 B2
(45) Date of Patent: May 11, 2010

(54) MULTI-LAYER RESTORATION METHOD USING LCAS

(75) Inventors: Chang Gyu Lim, Daejeon (KR); Jong Hyun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1209 days.

(21) Appl. No.: 11/283,472

(22) Filed: Nov. 18, 2005

(65) Prior Publication Data

US 2006/0120278 A1 Jun. 8, 2006

(30) Foreign Application Priority Data

Dec. 7, 2004 (KR) .................... 10-2004-0102503
May 21, 2005 (KR) .................... 10-2005-0042772

(51) Int. Cl.
*G01R 31/08* (2006.01)
*G06F 11/00* (2006.01)

(52) U.S. Cl. ..................................... 370/216
(58) Field of Classification Search ................ 370/216, 370/217, 225–228
See application file for complete search history.

(56) References Cited

U.S. PATENT DOCUMENTS 6,324,162 B1 * 11/2001 Chaudhuri ................. 370/225
6,507,561 B1   1/2003 Baniewicz et al.
2004/0252633 A1 * 12/2004 Acharya et al. ............. 370/216

FOREIGN PATENT DOCUMENTS

| JP | 07-288509 | 10/1995 |
| JP | 2002-359627 | 12/2002 |
| KR | 100248406 | 12/1999 |
| KR | 2000-0039438 | 7/2000 |
| KR | 1020030003613 | 1/2003 |

* cited by examiner

*Primary Examiner*—Kevin C Harper
(74) *Attorney, Agent, or Firm*—Blakely, Sokoloff, Taylor & Zafman LLP

(57) ABSTRACT

Provided is a multi-layer restoration method using a LCAS (Link Capacity Adjustment Scheme) in a synchronous network having a mesh structure. The method includes: performing a hardware restoration method if a network failure is detected; performing a pre-planned restoration method if the network failure is not repaired by performing the hardware restoration method; determining whether channels that pass along a line where the network failure occurs use the LCAS if the network failure is not repaired by performing the pre-planned restoration method; and applying the LCAS to the channels if the channels are determined to use the LCAS, and performing a dynamic restoration method if the channels are not determined to use the LCAS. The multiplayer restoration method minimizes data loss due to an increase in restoration time and overcomes service disconnection caused by failure to obtain a spare channel.

3 Claims, 4 Drawing Sheets

MULTI-LAYER RESTORATION METHOD USING LCAS

This application claims the benefit of Korean Patent Application Nos. 10-2004-0102503, filed on Dec. 7, 2004, and 10-2005-0042772, filed on May 21, 2005, in the Korean Intellectual Property Office, the disclosures of which are incorporated herein in their entirety by reference.

BACKGROUND OF THE INVENTION

1. Field of the Invention

The present invention relates to a multi-layer restoration method in a synchronous network having a mesh structure, and more particularly, to a multi-layer restoration method using a Link Capacity Adjustment Scheme (LCAS).

2. Description of the Related Art

In transmission equipment currently being developed for high-speed processing of mass signals in high-speed mass networks, hardware used has become complex and software for controlling the hardware has also increased in complexity. Therefore, network failure caused by disconnection of optical lines, natural disasters, etc., and equipment failure must be quickly repaired to provide stable service.

Conventional network restoration methods are divided into a centralized control system and a distributed control system according to a private recovering control system, and a line restoration method and a path restoration method according to an objective of a signal restoration method in which a hardware restoration method is divided into restoration methods of 1+1 and 1:N, and a software restoration algorithm is divided into a pre-planned restoration method and a dynamic restoration method.

The dynamic restoration method is a conventional restoration method that performs real time restoration based on network status after network fails. The dynamic restoration method transfers broadcasting restoration data using a data communication channel (DCC) between nodes of a link distribution system. Such a method increases data processing overhead, causing a reduction of restoration performance.

In the meantime, the pre-planned restoration method performs restoration using a predetermined restoration route according to a failure location, thereby increasing restoration performance. However, such a method cannot predetermined the restoration route for every network failure, increases an amount of memory, has vulnerability in a network traffic change, and thereby fails to restore every network failure.

SUMMARY OF THE INVENTION

The present invention provides a multi-layer restoration method that minimizes data loss due to an increase in restoration time, and repairs service disconnection caused by failure to obtain a spare channel.

According to an aspect of the present invention, there is provided a multi-layer restoration method using a Link Capacity Adjustment Scheme (LCAS), the method comprising: (a) performing a hardware restoration method if a network failure is detected; (b) performing a pre-planned restoration method if the network failure is not repaired by performing the hardware restoration method; (c) determining whether channels that pass along a line where the network failure occurs use the LCAS if the network failure is not repaired by performing the pre-planned restoration method; and (d) applying the LCAS to the channels if the channels are determined to use the LCAS, and performing a dynamic restoration method if the channels are not determined to use the LCAS.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which embodiments of the invention are shown.

Figure 1:
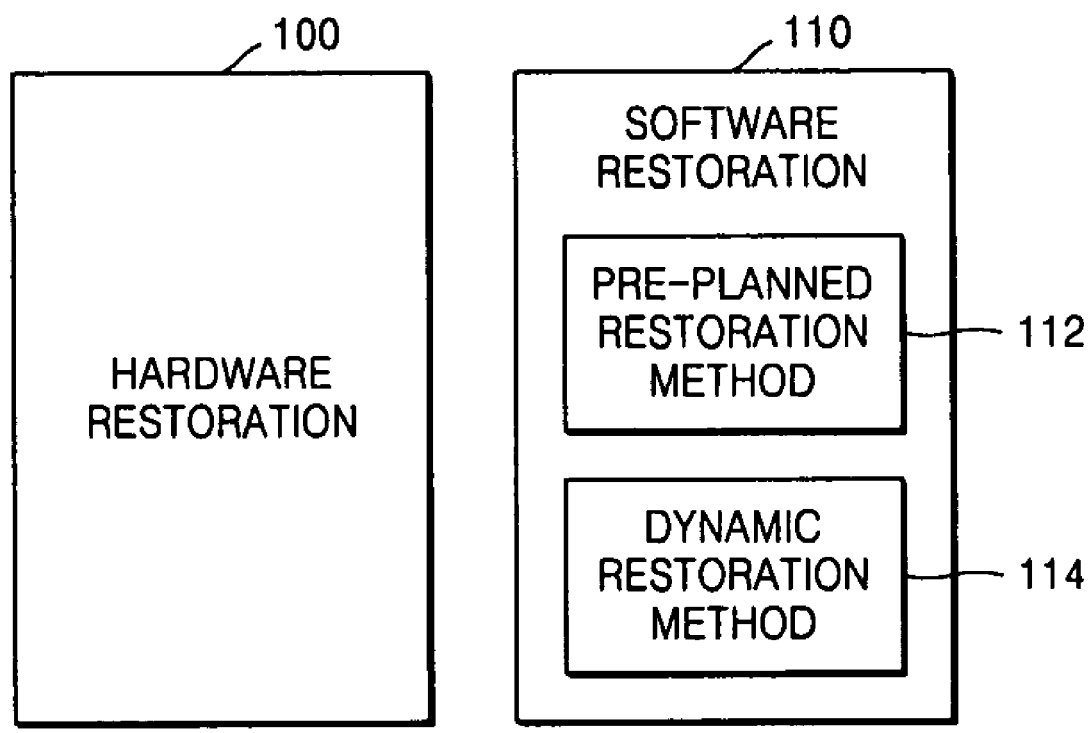
FIG. 1 is a block diagram of a multi-layer restoration method.

FIG. 1 is a block diagram of a multi-layer restoration method. Referring to FIG. 1, the multi-layer restoration method comprises a hardware restoration 100 and a software restoration method 110. The software restoration method 110 comprises a pre-planned restoration method 112 and a dynamic restoration method 114.

The hardware restoration method 100 is superior to the software restoration method 110 in terms of restoration time and reliability. Therefore, it is first determined whether to perform the hardware restoration method 100, and thereafter the software restoration method 110 is performed.

The pre-planned restoration method 112 results in a predetermined restoration rate and a fast restoration time. The dynamic restoration method 114 is performed for a channel that is not restored using the pre-planned restoration method 112, thereby obtaining a high restoration rate. Such a method is called a multi-layer restoration method.

Figure 2:
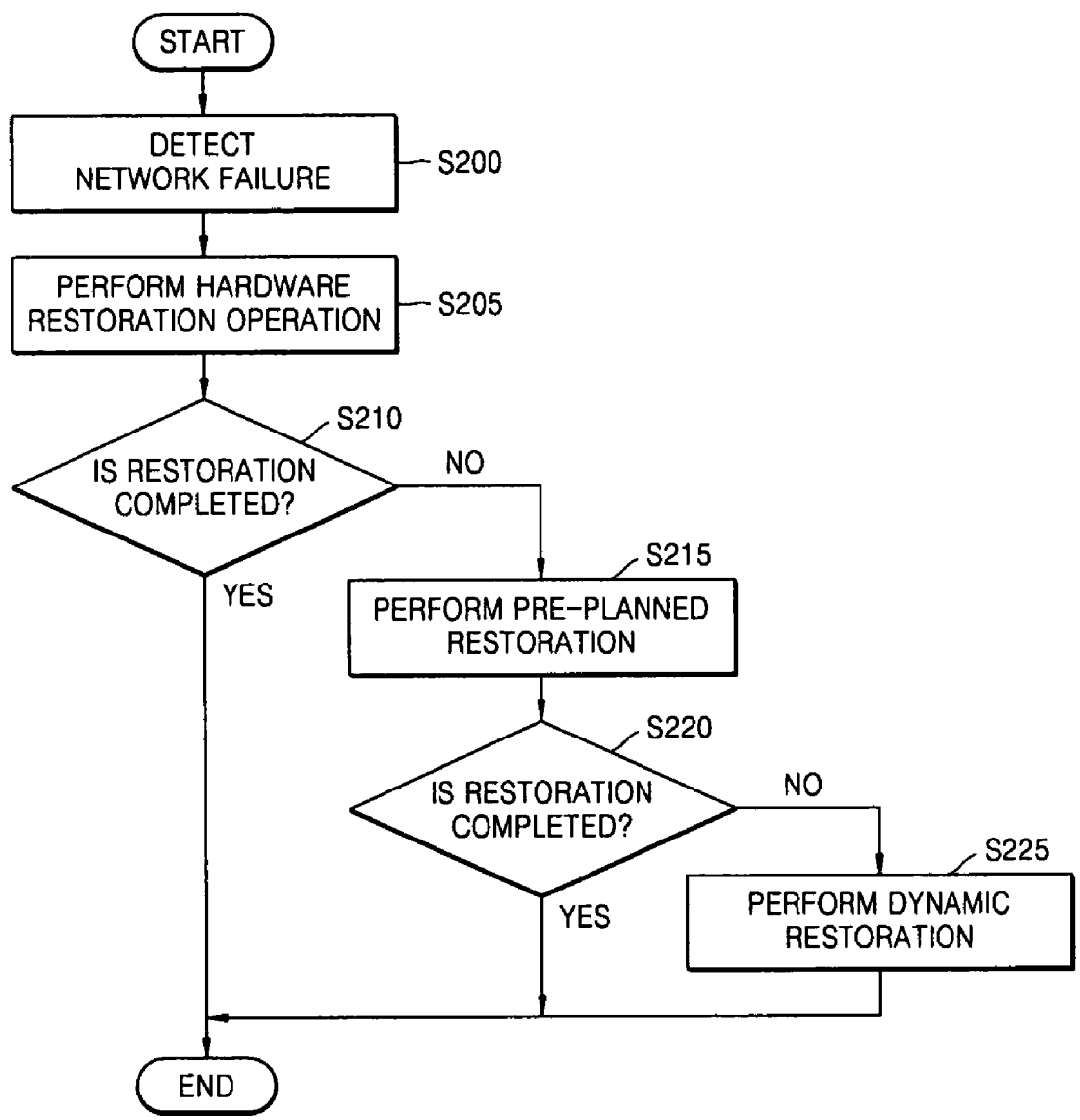
FIG. 2 is a flowchart of the multi-layer restoration method.

FIG. 2 is a flowchart of a multi-layer restoration method. Referring to FIG. 2, if network failure is detected (Operation S200), a hardware restoration method is performed (Operation S205). If the network failure is not repaired by performing the hardware restoration method (Operation S210), a pre-planned restoration method which is one of a plurality of software restoration methods is performed (Operation S215).

If the network failure is not repaired by performing the pre-planned restoration method (Operation S220), a dynamic restoration method which is one of the software restoration methods is performed (Operation S225).

However, such a multi-layer restoration method increases restoration time since broadcasting of a dynamic restoration message results in a time increase for restoration message processing, which causes data loss and service disconnection due to failure to obtain a spare channel.

Figure 3:
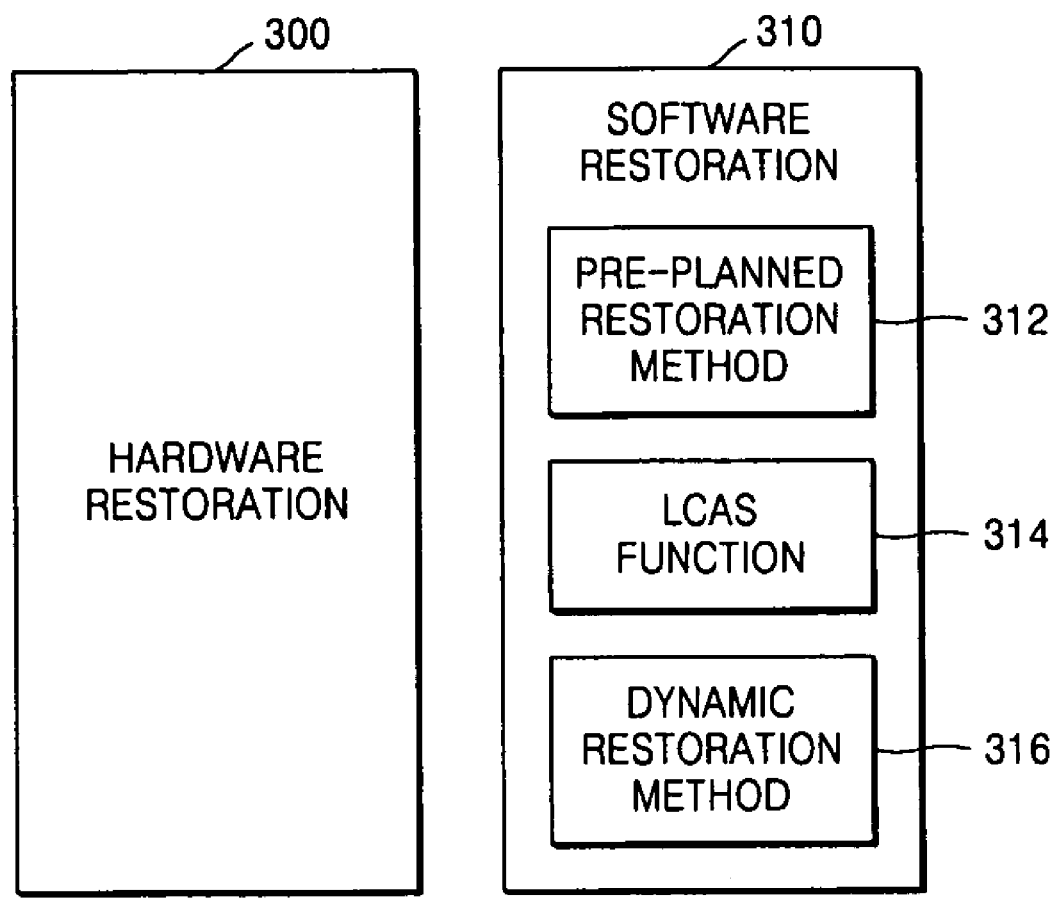
FIG. 3 is a block diagram of a multi-layer restoration method using a Link Capacity Adjustment Scheme (LCAS) according to an embodiment of the present invention.

FIG. 3 is a block diagram of a multi-layer restoration method using a Link Capacity Adjustment Scheme (LCAS) according to an embodiment of the present invention. Referring to FIG. 3, the multi-layer restoration method using the LCAS comprises a hardware restoration method 300 and a software restoration method 310, which is the different from the software restoration method of FIG. 1. The software restoration method 310 comprises a pre-planned restoration method 312, an LCAS function 314, and the dynamic restoration method 316.

The operations of the hardware restoration method 300, the pre-planned restoration method 312, and a dynamic restoration method 316 are the same as those of FIGS. 1 and 2.

The LCAS performs automatic removal and restoration of a failure path that occurs in a virtual concatenation, and the function to increase or decrease the capacity of link without an error. The LCAS uses a control packet according to the ITU-T G.7042 standard.

The LCAS function 314 performs the automatic removal and restoration of the failure path in the present invention. To be more specific, when service of a member of a Virtual Concatenation Adjustment Scheme (VCAT) Group (VCG) in a Synchronous Digital Hierarchy/Optical Transmission Network (SDH/OTN) is provided due to network failure, the LCAS function 314 automatically reduces the capacity of link by repairing the member or automatically returns the capacity of link by restoring the network failure so as to restore multi-layers using the LCAS.

Also, the LCAS function 314 defines a message between a source side and a sink side and status required by the source side and the sink side for a flexible adjustment of a VCAT signal. The LCAS function 314 provides a control mechanism capable of guaranteeing hitless when the capacity of VCG signal is increased or decreased at the request of a specific application.

Such an LCAS function is added to the multi-layer restoration method, thereby minimizing data loss of a specific channel having the LCAS function, and a link blocking probability.

The multi-layer restoration method including the LCAS function will now be described in detail with reference to FIG. 4.

Figure 4:
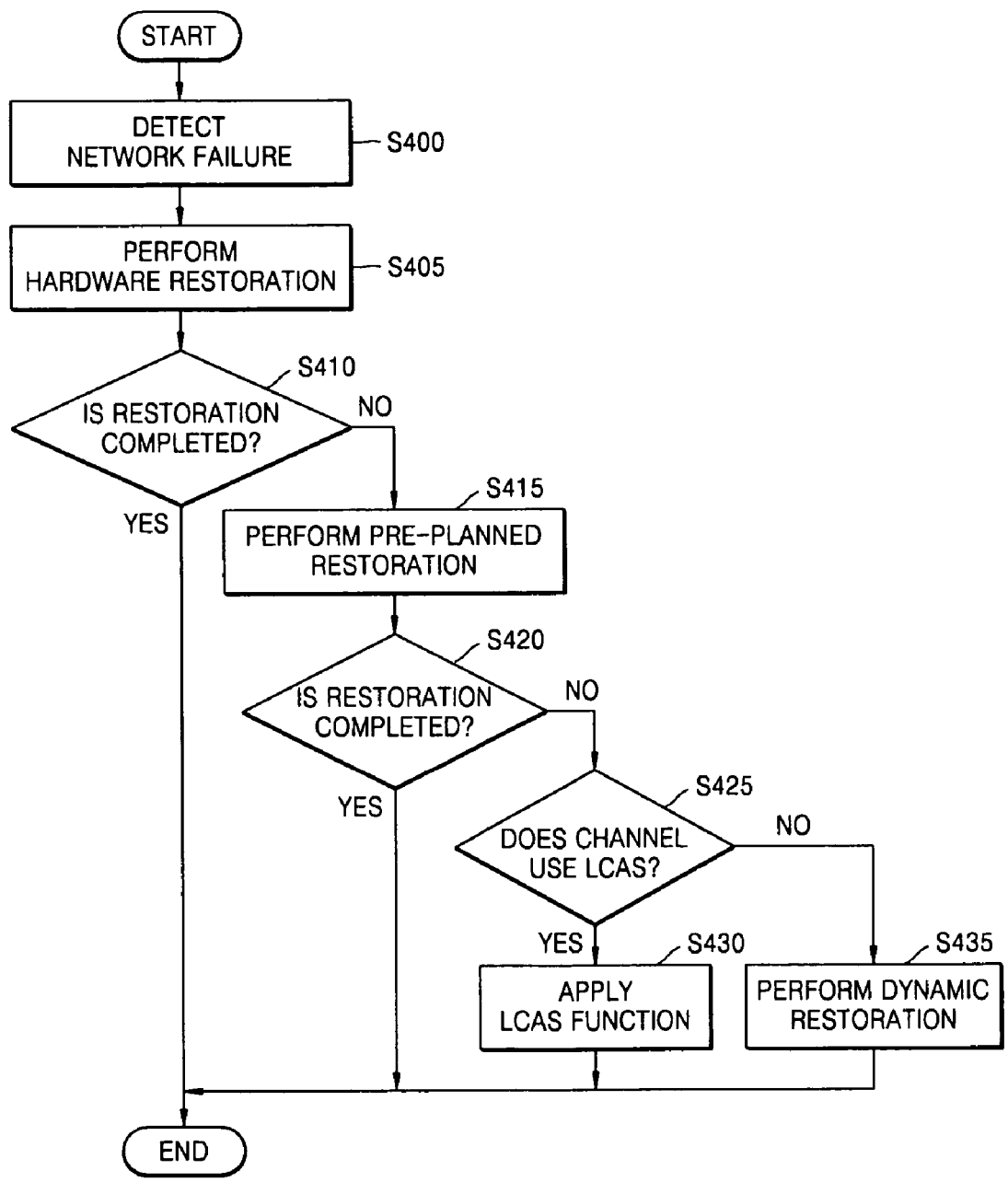
FIG. 4 is a flowchart of the multi-layer restoration method using the LCAS according to an embodiment of the present invention.

FIG. 4 is a flowchart of a multi-layer restoration method using the LCAS according to an embodiment of the present invention. Referring to FIG. 4, if network failure is detected (Operation S400), a hardware restoration method is performed (Operation S405). If the network failure is not repaired by performing the hardware restoration method, a software restoration method is performed (Operation S410). A time period required to perform the hardware restoration method is restricted to 50 ms.

The software restoration method is first performed using a pre-planned restoration method (Operation S415). If the network failure is not repaired by performing the pre-planned restoration method (Operation S420), it is determined whether a specific channel that passes along a line where network failure occurs uses the LCAS function (Operation S425).

If the specific channel is determined to use the LCAS function (Operation S425), the LCAS function as described in FIG. 3 is applied (Operation S430). If the specific channel is not determined to use the LCAS function (Operation S425), a dynamic restoration method is performed (Operation S435).

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves. The computer readable recording medium can also be distributed network coupled computer systems so that the computer readable code is stored and executed in a distributed fashion.

According to the present invention, the multi-layer restoration method using the LCAS having a Next Generation-SDH (NG-SDH) function in a Synchronous Digital Hierarchy/Synchronous Digital Hierarchy (SONET/SDH) with a mesh structure minimizes data loss due to an increase in restoration time and overcomes service disconnection caused by failure to obtain a spare channel in comparison with a conventional multi-layer restoration method.

While the present invention has been particularly shown and described with reference to exemplary embodiments thereof, it will be understood by those of ordinary skill in the art that various changes in form and details may be made therein without departing from the spirit and scope of the invention as defined by the appended claims and their equivalents.

What is claimed is:

1. A multi-layer restoration method using a Link Capacity Adjustment Scheme (LCAS), the method comprising:
    (a) performing a hardware restoration method if a network failure is detected;
    (b) performing a pre-planned restoration method if the network failure is not repaired by performing the hardware restoration method;
    (c) determining whether channels that pass along a line where the network failure occurs use the LCAS if the network failure is not repaired by performing the pre-planned restoration method; and
    (d) applying the LCAS to the channels if the channels are determined to use the LCAS, and performing a dynamic restoration method if the channels are not determined to use the LCAS.

2. The method of claim 1, wherein operation (d) comprises:
    (d1) reducing the capacity of link of the channels and repairing the network failure if the channels are determined to use the LCAS.

3. The method of claim 2, wherein operation (d) comprises:
    (d2) restoring the capacity of link of the channels if the network failure is repaired.

* * * * *